No. 883,927. PATENTED APR. 7, 1908.
J. ARMSTRONG.
COFFEE POT.
APPLICATION FILED MAY 7, 1906.

2 SHEETS—SHEET 1.

Witnesses.
H. L. Trimble.
B. Sheffield

Inventor.
John Armstrong
by Chas H Riches
his Attorney

No. 883,927. PATENTED APR. 7, 1908.
J. ARMSTRONG.
COFFEE POT.
APPLICATION FILED MAY 7, 1906.

2 SHEETS—SHEET 2.

Witnesses. Inventor.

UNITED STATES PATENT OFFICE.

JOHN ARMSTRONG, OF TORONTO, ONTARIO, CANADA.

COFFEE-POT.

No. 883,927.   Specification of Letters Patent.   Patented April 7, 1908.

Application filed May 7, 1906. Serial No. 315,459.

*To all whom it may concern:*

Be it known that I, JOHN ARMSTRONG, of the city of Toronto, in the county of York and Province of Ontario, Canada, have invented certain new and useful Improvements in Coffee-Pots; and I hereby declare that the following is a full, clear, and exact description of the same.

This invention relates to a coffee pot comprising a liquor reservoir having an annular ledge therein near its upper end, a coffee holder within the liquor reservoir, to hold the pulverized coffee, consisting of a fabric pouch and an annular metal rim to rest upon the annular ledge and hold the pouch suspended within the liquor reservoir, an aperture in the side of the reservoir above the coffee holder, a removable funnel fitted into said aperture to direct the boiling water or boiling milk to the center of the coffee holder, a hollow lid for the liquor reservoir to contain cold water so that it will act as a condenser for the steam and essential oils or aroma from the coffee, having an inlet aperture and a stopper for said aperture, as hereinafter more fully set forth and more particularly pointed out in the claims.

For a full understanding of the invention reference is to be had to the following description and to the accompanying drawings in which—

Figure 1:
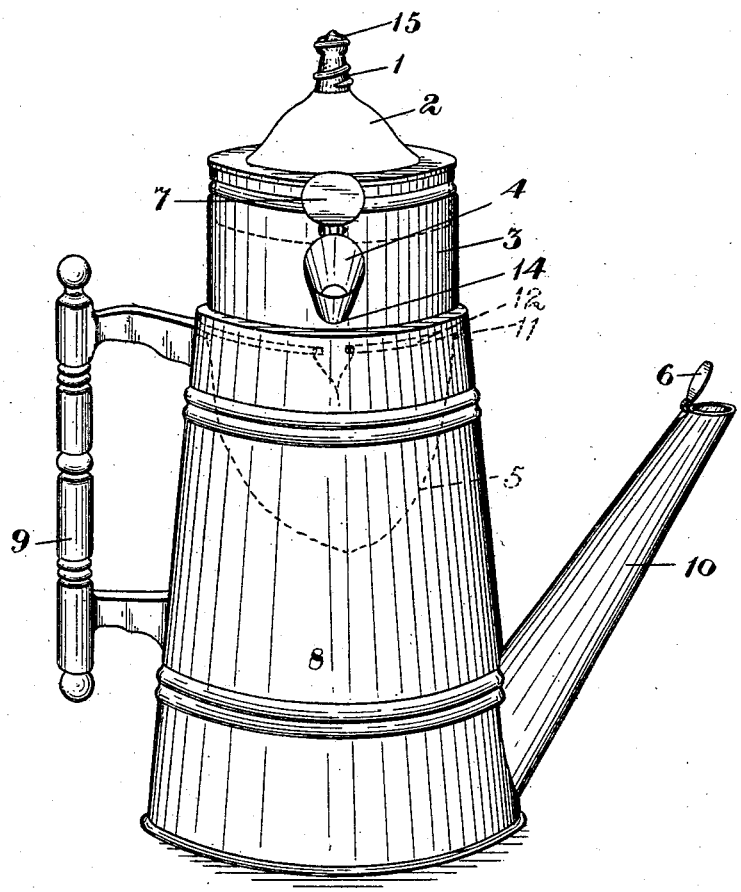
Figure 2:
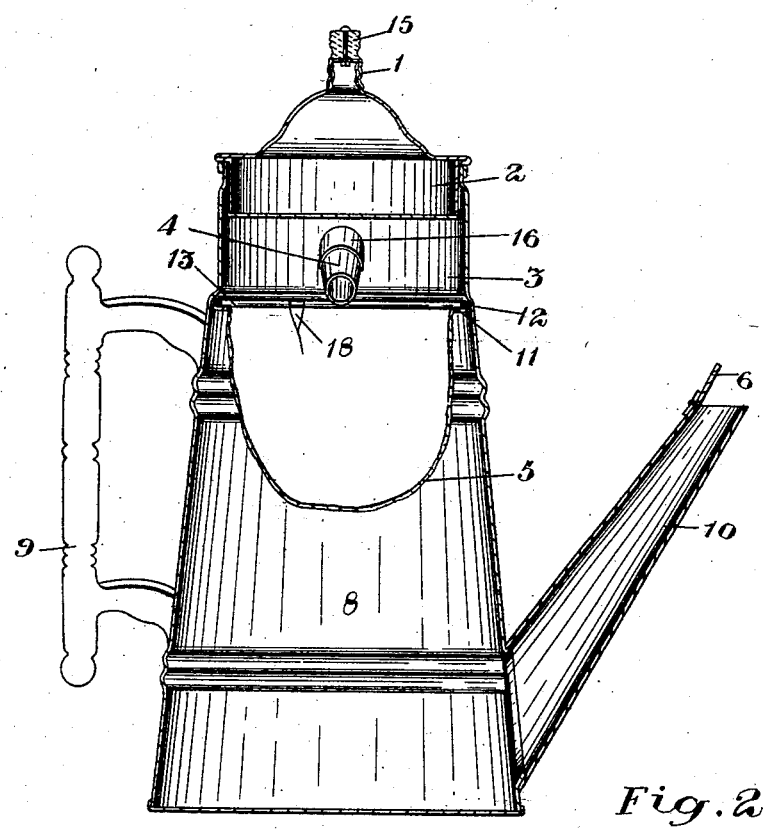
Figure 3:
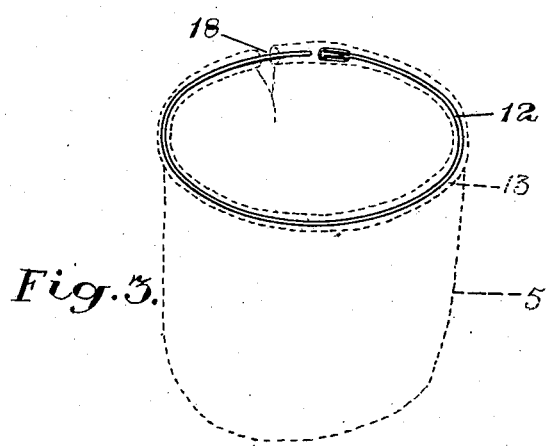

Figure 1 is a perspective view of the exterior of the coffee pot, and Fig. 2 is a vertical section through the same. Fig. 3 is a detail view of the coffee holder.

Like numerals of reference refer to like parts.

The liquor reservoir 8 is fitted with the usual handle 9 and spout 10, the spout having at its outlet end a hinged lid 6 to prevent the escape of the steam and aroma from the liquor within the reservoir 8. At the upper end of the reservoir 8 is an annular extension 3 having at its lower end an internal annular ledge 11 upon which is supported the rim 12 of the coffee holder. The coffee holder consists of a pouch 5 to contain pulverized coffee and an annular rim 12 which is preferably formed of a piece of non-corrosive wire bent into a circular shape with an opening between its ends to permit the rim to enter the hem 13 of the pouch 5.

In making the coffee pot, the annular extension 3 is formed by bending its lower edge inwardly to form the internal annular ledge 11. The annular extension is then inserted into the top of the liquor reservoir 8 and soldered thereto so as to constitute an integral part of the coffee pot. The ledge 11 by being made an integral part of the extension 3 cannot become detached from it under ordinary conditions, and will always be able to perform the function of supporting the coffee holder within the coffee pot. To provide for the admission of boiling water or boiling milk into the liquor reservoir, an aperture 14 is formed through the extension 3 above the coffee holder and fitted into the aperture 14 is a removable funnel 4, which projects within the coffee pot sufficiently to direct the boiling water or boiling milk towards the middle of the coffee holder so that it can be equally distributed to all parts thereof. The funnel 4 has a hinged lid 7 to prevent the escape of the aroma or steam from the liquor through the funnel. By arranging the funnel 4 in this way, it can be removed from the coffee pot so that it will not obstruct the passage of the coffee holder when the latter is being placed in position on the supporting ledge or removed therefrom. An inwardly projecting flange 16 is formed around or partially around the aperture 14, and is so arranged as to hold the funnel 4 in an inclined position with its inner end pointing downwards towards the center of the coffee holder.

Closing the upper end of the annular extension 3 is a hollow lid 2, the outer diameter of which is substantially the same as the inner diameter of the extension to make a close contact therewith. The body of the hollow lid 2 is of a substantially cylindrical shape and has a concial top with an inlet aperture at the centre thereof for the admission of cold water into the lid. Closing the aperture is a removable stopper 1 having a handle 15 by which the stopper can be separated from the lid or the lid removed from the coffee pot.

The use of the apparatus is as follows:—Pulverized coffee is placed in the pouch 5 of the coffee holder and the coffee holder is then placed within the coffee pot so that its rim 12 will rest upon the top of the annular ledge 11 and hold the pouch 5 suspended within the liquor reservoir 8, the funnel 4 being removed to permit of the unobstructed passage of the coffee holder through the extension 3 to the ledge: the rim of the coffee holder being turned slantwise to clear the flange 16. When the coffee holder is placed in position within the coffee pot the funnel is fitted into the aperture 14 and the lid 2 is placed to close the top of the extension 3. The stopper 1 is removed from the inlet aperture and cold water is poured into the hollow lid 2 so that the lid can act as a condenser to liquefy the steam and the essential oils or aroma arising from the liquor in the reservoir and cause the condensed liquid to return thereto. The removable stopper 1 is then replaced and boiling water or boiling milk is poured through the funnel 4 which directs it towards the middle of the coffee holder so that it will be equally distributed to all parts thereof. The lid 7 for the funnel 4 and the lid 6 for the spout are then closed to prevent the escape of the aroma and steam, and the coffee is allowed to steep until sufficient time has elapsed for the liquor to become of proper strength after which it is poured out through the spout, the lid 6 automatically opening for that purpose under the influence of the outrushing liquor. When the liquid contents of the pot are exhausted, the lid can be removed and more pulverized coffee placed within the coffee holder and more boiling water or boiling milk introduced through the funnel without removing the coffee holder from the liquor reservoir. When it is desired to clean the coffee pot the funnel can be removed to permit of the removal of the coffee holder which is lifted from the ledge and raised into a slanting position to clear the flange 16 as the coffee holder is withdrawn from the extension. When the pouch 5 has become useless, the rim 12 can be removed from the hem 13 by withdrawing it endwise through the opening 18 in the hem provided for that purpose.

Having thus fully described my invention what I claim as new and desire to secure by Letters Patent is:

A distillation coffee pot comprising a body portion having a pouring spout with a hinged lid, a hollow imperforate cover for the top of the body portion forming a condensing chamber, said cover being provided with a filling opening, a stopper to close the filling opening, a sack supporting means within the body portion below the cover, a filling tube extending from the side of the body portion between the cover and sack supporting means, and a hinged lid for the outer end of the filling tube.

Toronto, April 28th, A. D. 1906.

JOHN ARMSTRONG.

Signed in the presence of—
   CHAS. H. RICHES,
   EDWARD B. SHEFFIELD.